United States Patent
Sharma et al.

(10) Patent No.: US 10,356,038 B2
(45) Date of Patent: Jul. 16, 2019

(54) SHARED MULTI-TENANT DOMAIN NAME SYSTEM (DNS) SERVER FOR VIRTUAL NETWORKS

(71) Applicant: Microsoft Technology Licensing, LLC, Redmond, WA (US)

(72) Inventors: Vijay Kumar Sharma, Hyderabad (IN); Tushar Gupta, Hyderabad (IN); Vithalprasad Gaitonde, Hyderabad (IN); Sourav Sain, Hyderabad (IN); Kumar Ashutosh, Hyderabad (IN); Ashray Mahodaya, Hyderabad (IN); Gareth Bradshaw, Dublin (IE); Cristian Costache, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 15/148,715

(22) Filed: May 6, 2016

(65) Prior Publication Data
US 2017/0171146 A1 Jun. 15, 2017

(30) Foreign Application Priority Data
Dec. 14, 2015 (IN) .......................... 6691/CHE/2015

(51) Int. Cl.
*H04L 29/12* (2006.01)
*H04L 29/08* (2006.01)

(52) U.S. Cl.
CPC ...... *H04L 61/1511* (2013.01); *H04L 67/1002* (2013.01); *H04L 67/2804* (2013.01)

(58) Field of Classification Search
None
See application file for complete search history.

(56) References Cited

U.S. PATENT DOCUMENTS

| | | | |
|---|---|---|---|
| 6,480,508 B1 | 11/2002 | Mwikalo et al. | |
| 6,587,455 B1 * | 7/2003 | Ray | H04L 12/4641 370/352 |
| 7,853,714 B1 | 12/2010 | Moberg et al. | |
| 7,970,765 B1 | 6/2011 | Olsen et al. | |
| 8,707,429 B2 | 4/2014 | Wilbourn et al. | |
| 8,762,574 B2 | 6/2014 | Barber | |
| 8,825,839 B2 | 9/2014 | Brandt et al. | |
| 8,874,790 B2 | 10/2014 | McPherson | |

(Continued)

FOREIGN PATENT DOCUMENTS

WO   WO 2012/065641 A1   5/2012

OTHER PUBLICATIONS

Vixie; "Extension Mechanisms for DNS (EDNS0)"; Network Working Group; The Internet Society; Aug. 1999; 8 pages.

(Continued)

*Primary Examiner* — Sargon N Nano
*Assistant Examiner* — Christopher B Robinson
(74) *Attorney, Agent, or Firm* — Fiala & Weaver P.L.L.C.

(57) ABSTRACT

A DNS proxy may tag DNS requests from a virtual network with a separating identifier, such as a virtual network ID, before forwarding them to a shared DNS server. This can allow each virtual network to have its own namespace and avoid naming conflicts. The shared DNS server can examine the tagged DNS requests to respond to the DNS requests using the local namespace as identified by the separating identifier.

20 Claims, 6 Drawing Sheets

(56) References Cited

U.S. PATENT DOCUMENTS

| | | | |
|---|---|---|---|
| 8,935,427 B2 | 1/2015 | Outhred et al. | |
| 2002/0002622 A1* | 1/2002 | Vange | G06F 9/5027 |
| | | | 709/245 |
| 2002/0112076 A1* | 8/2002 | Rueda | H04L 12/14 |
| | | | 709/245 |
| 2006/0013209 A1 | 1/2006 | Somasundaram | |
| 2007/0233851 A1 | 10/2007 | Ma | |
| 2008/0189415 A1* | 8/2008 | Vaswani | G01D 4/004 |
| | | | 709/226 |
| 2009/0043900 A1 | 2/2009 | Barber | |
| 2013/0024503 A1* | 1/2013 | Neerdaels | H04L 29/06 |
| | | | 709/203 |
| 2014/0089523 A1* | 3/2014 | Roy | H04L 45/04 |
| | | | 709/242 |
| 2014/0181306 A1 | 6/2014 | Kothamasu et al. | |
| 2014/0269712 A1 | 9/2014 | Kidambi | |
| 2015/0063351 A1 | 3/2015 | Moreno et al. | |
| 2015/0074221 A1 | 3/2015 | Kuparinen et al. | |
| 2015/0131674 A1 | 5/2015 | Kao et al. | |
| 2015/0244643 A1* | 8/2015 | Kinoshita | G06F 9/45558 |
| | | | 709/226 |
| 2015/0256508 A1* | 9/2015 | Townsend | H04L 61/20 |
| | | | 709/245 |
| 2015/0264121 A1 | 9/2015 | Van Biljon et al. | |
| 2015/0281111 A1* | 10/2015 | Carl | H04L 47/70 |
| | | | 709/226 |
| 2016/0072847 A1* | 3/2016 | Bremen | G06F 21/305 |
| | | | 726/1 |

OTHER PUBLICATIONS

International Patent Application No. PCT/US2016/065040; Int'l Search Report and the Written Opinion; dated Mar. 3, 2017; 12 pages.

Tejada, et al., "Exam Ref 70-532 Developing Microsoft Azure Solutions", In Publication of Microsoft Press, Mar. 16, 2015, 432 pages.

International Patent Application No. PCT/US2016/065038; Written Opinion; dated Nov. 6, 2017; 7 pages.

"International Preliminary Report on Patentability Issued in PCT Application No. PCT/US2016/065040", dated Jan. 26, 2018, 7 Pages.

"Second Written Opinion Issued in PCT Application No. PCT/US2016/065040", dated Oct. 19, 2017, 6 Pages.

* cited by examiner

SHARED MULTI-TENANT DOMAIN NAME SYSTEM (DNS) SERVER FOR VIRTUAL NETWORKS

CROSS-REFERENCE TO RELATED APPLICATIONS

This Application claims the benefit of Indian Patent Application Serial No. 6691/CHE/2015, filed Dec. 14, 2015, the disclosure of which is hereby incorporated by reference as set forth in its entirety.

BACKGROUND

The Domain Name System (DNS) is a hierarchical distributed naming system for resources connected to networks, such as the Internet. The Domain Name System associates numerical IP addresses with domain names of network entities. DNS servers translate domain names, which can be easily remembered and used by humans, to numerical IP addresses. DNS servers can also store and provide other record types (such as Canonical Name (CNAME), free form text (TXT), mail exchanger record (MX record), Pointer records (such as PTR records) that do different functions.

The Domain Name System maintains the domain name hierarchy and provides translation services between it and the Internet Protocol (IP) address space. Internet name servers and a communication protocol implement the Domain Name System. A DNS name server is a server that stores the DNS records for a domain name, receives DNS requests and responds with answers to queries against its database.

In addition to the Domain names that it is responsible for, DNS servers typically cache DNS requests and responses that have been received from other DNS name servers. Caching name servers (DNS caches) store DNS query results for a period of time determined in an associated time-to-live of a domain-name record. DNS caches improve the efficiency of the DNS by reducing DNS traffic across the Internet, and by reducing load on authoritative name-servers, particularly root name-servers. Because they can answer questions more quickly, they also increase the performance of end-user applications that use the DNS.

SUMMARY

Embodiments concern a DNS server that can be shared by multiple virtual networks in a cloud computing environment.

A DNS proxy may tag DNS requests from a virtual network with an identifier, such as a virtual network ID, before forwarding them to a shared DNS server. This can allow each virtual network to have its own namespace and avoid naming conflicts.

The shared DNS server can examine the tagged DNS requests to respond to the DNS requests using the local namespace as identified by the virtual network ID.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Embodiments concern a system and method for providing a shared domain name resolution services for a multitenant network.

A cloud service provider (CSP) is a company that offers some component of cloud computing, such as Infrastructure as a Service (IaaS), Software as a Service (SaaS) or Platform as a Service (PaaS), to other businesses or individuals. Cloud service providers often aim to facilitate onboarding of the tenants' private networks into their environments for which they need to keep the addressing and naming properties of these networks intact while providing appropriate network isolation between tenants. The network virtualization technologies allow tenants to bring their own IP addresses or IP address space in a managed cloud. Embodiments can solve the issue of providing name resolution services for the virtual networks where customers can bring their own domain names. The systems can also ensure privacy by preventing private domains from being seen outside the virtual network.

Embodiments define the capabilities and interfaces for a shared DNS server composed of different virtualization instances that host isolated domain name databases, catering to different virtual networks. Embodiments also define a DNS proxy that listens to the virtual networks; identifies and adds tenant metadata into the DNS packets (in form of a EDNS0 option) which are received by the DNS server which processes the metadata to identify the virtualization instance.

Figure 1:
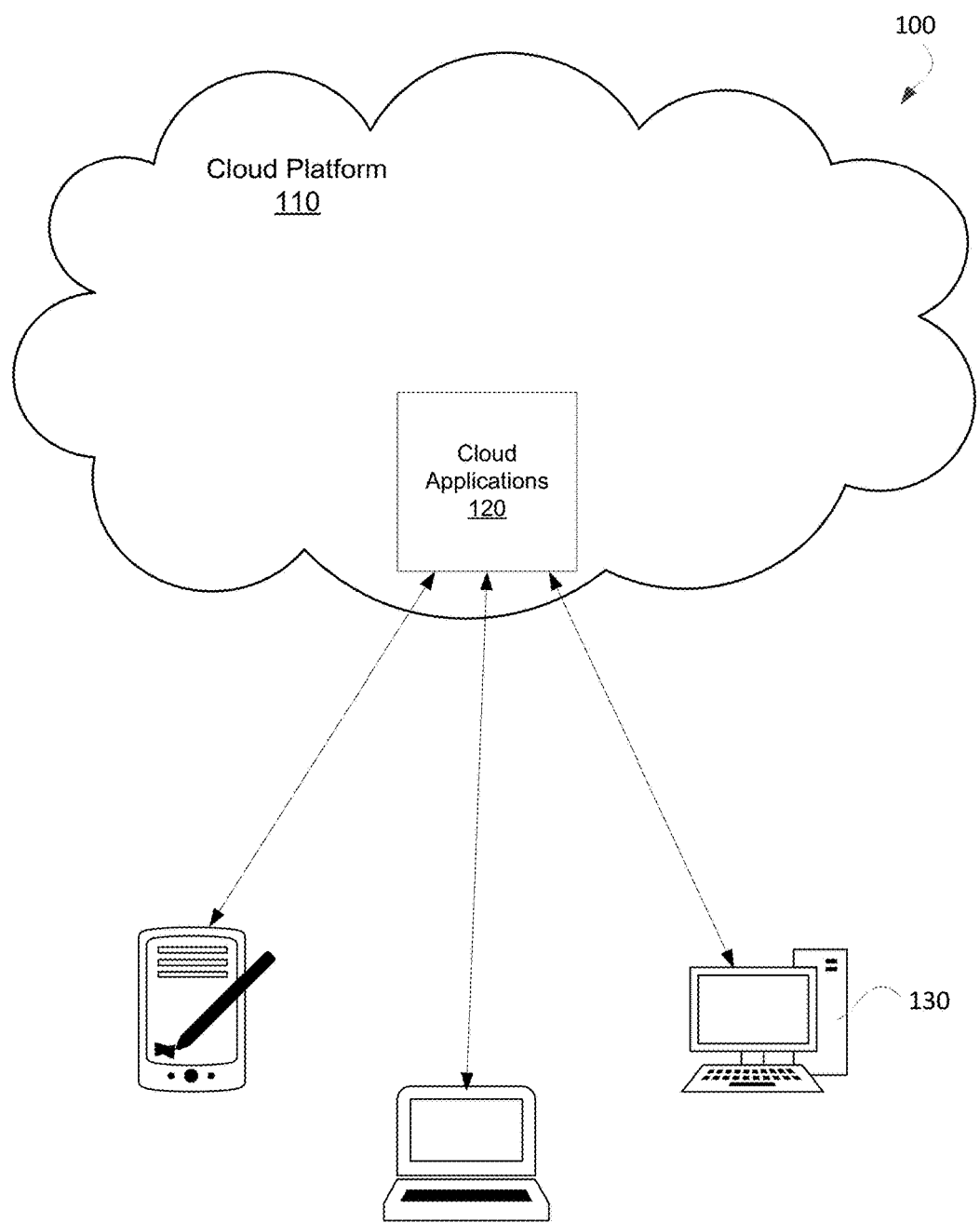
FIG. 1 is a network diagram that illustrates an exemplary computing system.

Benefits can include:

1. Ability to allow tenants of a managed cloud to bring their own domain names.
2. Ability to use a shared authoritative DNS server that provides name resolution services for tenants with overlapping domain name spaces with appropriate tenant isolations.
3. Ability to provide the above services irrespective of the virtualization technologies used by the provider.
4. Isolation of tenant domain name databases from the query and management perspective FIG. 1 is a network diagram that illustrates an exemplary computing system 100. In an embodiment, the computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains computing devices that provide virtual machines, which execute the cloud application 120. The cloud computing platform also includes storage resources that store applications and system information. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines provided by the cloud computing platform 110 execute the cloud applications 120. The cloud applications 120 may include, but are not limited to, editing applications, network management applications, finance applications, or any application requested or developed by the client devices 130. In certain embodiments, some functionality of the cloud application 120 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130. Cloud applications 120 can also handle necessary scale, security and availability issues that the client devices 130 may not be setup for.

An exemplary cloud computing platform is Microsoft Azure. Microsoft Azure uses a specialized operating system, also called Microsoft Azure, to run its "fabric layer": a cluster hosted at Microsoft's data centers that manage computing and storage resources of the computers and provisions the resources (or a subset of them) to applications running on top of Microsoft Azure.

The cloud computing system can use cloud computing devices and software at a client data center, such as with Microsoft Azure Stack. Moving cloud computing techniques to a company datacenter can provide agility and productivity for application owners, flexibility and control for Information technology (IT) units, and assurance that corporate assets are protected.

Figure 2:
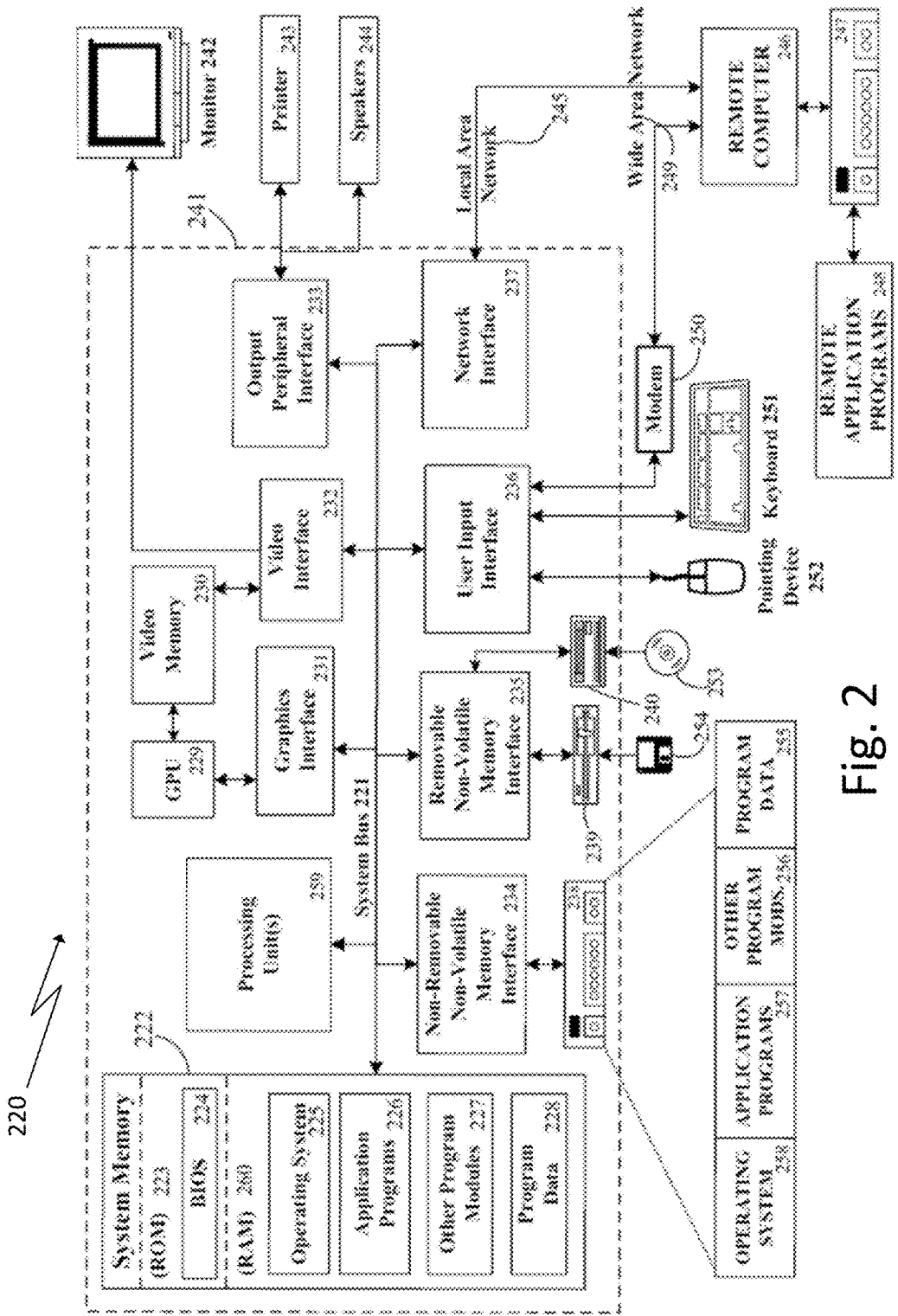
FIG. 2 shows an exemplary non-limiting server or computer that can implement disclosed embodiments.

FIG. 2 shows an exemplary non-limiting server or computer 202 that can implement disclosed embodiments. Such a server or computer can be used to implement cloud computing, the DNS proxy, and DNS server.

In FIG. 2, the computing environment 220 comprises a computer 241, which typically includes a variety of computer readable media. Computer readable media may be any available media that may be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above provide storage of computer readable instructions, data structures, program modules and other data for the computer 241. In FIG. 2, for example, hard disk drive 238 is illustrated as storing operating system 258, application programs 257, other program modules 256, and program data 255. Note that these components may either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, which may take the form of a mouse, trackball, or touch pad, for instance. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232, which may operate in conjunction with a graphics interface 231, a graphics processing unit (GPU) 229, and/or a video memory 229. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It will be appreciated that the network connections shown are exemplary and other means of establishing a communications link between the computers may be used.

A virtual network is a computer network that consists, at least in part, of virtual network links. A virtual network link is a link that does not consist of a physical (wired or wireless) connection between two computing devices but is implemented using methods of network virtualization.

Multi-tenant architectures may use multiple virtual networks. As disclosed below, each virtual network may have need of a DNS server.

One solution is for each tenant (virtual network) to deploy one virtual machine (VM) as a DNS server in its network, where it manages and hosts the required domains. The tenant virtual machines point to this DNS server for name resolution. This DNS server may double up as an authoritative server as well as a forwarder/recursive resolver for external queries. This solution is non-optimal as it requires one dedicated VM per tenant which is dedicated for DNS and puts the management overhead on the clients. This solution also doesn't provide fault tolerance, e.g. if the VM dies.

Another solution is for each tenant virtual network to use restricted name spaces. In this solution, the clients cannot bring their own domain name into the cloud. They are forced to keep some specific DNS suffixes (say in format <VM-Name>.<Tenant-ID>.myclouddomain.com). In this solution, the DNS resolution works fine, but an extra access control list (ACL) has to be created on the query path to ensure that one tenant cannot resolve names for another tenant.

These solutions may not be cost effective or may limit the capacity or functionality of the system. The following describes a solution that allows tenants to use a single DNS server to serve multiple clients with full isolation and allows customers to bring their own domain name to cloud. This facilitates seamless migration of tenant domains to/from private-public cloud.

Figure 3:
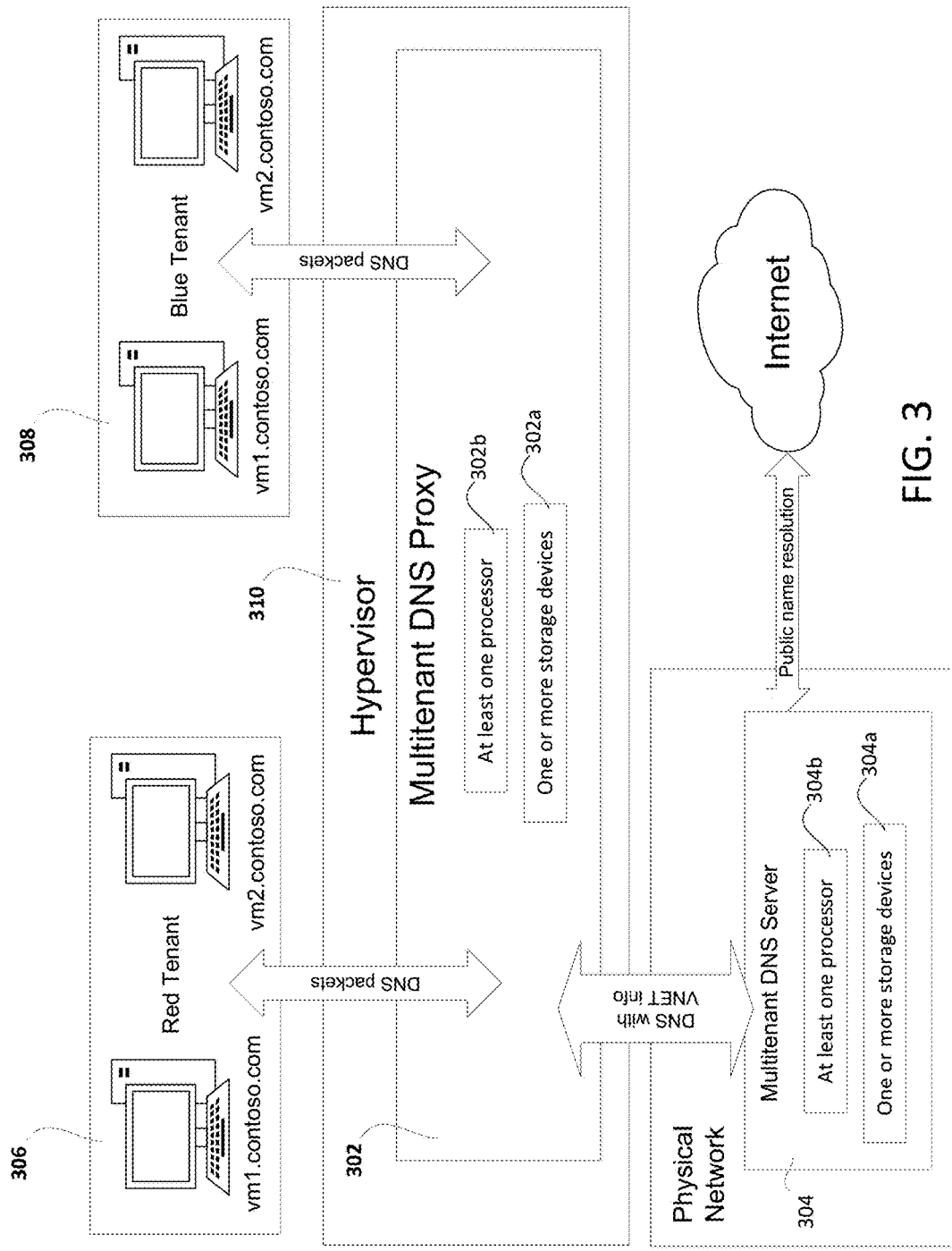
FIG. 3 illustrates a system of one embodiment.

In one embodiment, as shown in FIG. 3, a Multi-tenant DNS solution may have two major components, a (multi-tenant) DNS proxy 302 and a (multi-tenant) DNS Server 304.

DNS proxy 302 can comprise computer or server including one or more storage devices 302a and one or more processors 302b in communication with the one or more storage devices 302a. The one or more processors 302b may be configured to do operations as described below.

The DNS proxy 302 can be considered to be a gateway for forwarding DNS traffic. It may listen to the DNS packets emanating from tenant networks and forwards the query to the DNS server 304 on the physical network. Apart from forwarding the multitenant proxy can also add an EDNS0 option ID, as defined by Internet standards track protocol RFC 2671 (Extension Mechanisms for DNS (EDNS0)), into the outgoing DNS packet. This optional ID can contain a separating identifier such as the Virtual Network ID (VNET identifier). This identifier is used by DNS server 304 to ensure isolation. On the return path the proxy may clean up the EDNS0 option and routes the packet back to the tenant VM.

Figure 4:
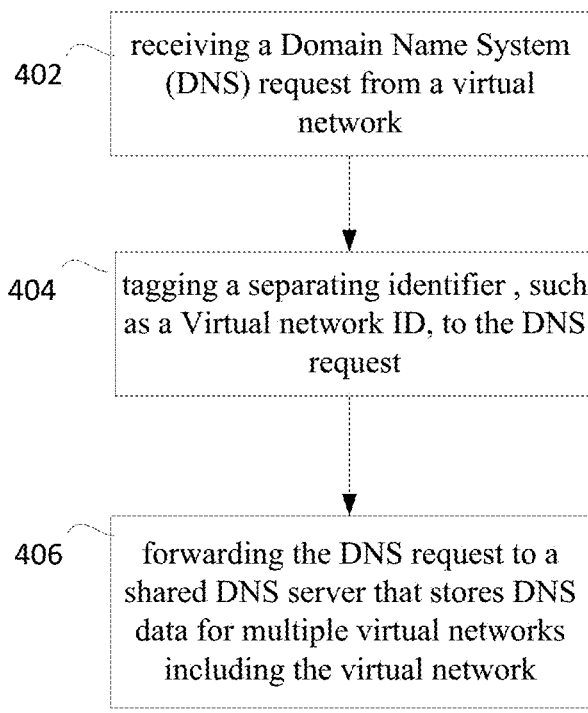
FIG. 4 illustrates a method that can be performed at the DNS proxy.

FIG. 4 illustrates a method that can be done at the DNS proxy 302.

In step 402, a Domain Name System (DNS) request is received from a virtual network. The DNS proxy 302 may intercept the DNS request as it is being sent to the shared DNS server 304.

In step 404, a DNS request is tagged with a separating identifier. The separating identifier can be any identifier that separates any two parties, e.g. it could be per company, per person, per application, per anything else. The separating identifier can be a virtual network ID.

In one example, the separating identifier, such as the virtual network ID, is placed in an option field. For example, the separating identifier may be placed in an EDNS0 option field. Alternately, the separating identifier can be appended in some other way to the DNS request.

In step 406, the DNS request is forwarded to a shared DNS server 304 that stores DNS data for multiple virtual networks including the virtual network.

Looking again at FIG. 3, the DNS proxy 302 receives a DNS request from a virtual network, such as virtual network 306. The DNS proxy 302 tags a separating identifier (such as a virtual network ID for the virtual network 306) to the DNS request. The DNS proxy 302 forwards the DNS request to a shared DNS server that stores DNS data for multiple virtual networks including the virtual network.

The DNS proxy 302 may also be configured to receive a DNS response to the DNS request from the shared DNS server 304. The DNS response can be also tagged with the separating identifier, such as the virtual network ID. This DNS response can then be forwarded to the correct virtual network as indicated by the separating identifier, such as the virtual network ID. In another embodiment, the routing of the reply doesn't need to be done using the separating identifier, such as the virtual network ID.

The DNS proxy 302 can examine all DNS requests and DNS responses at a location. In FIG. 3, a hypervisor 310 can include the DNS proxy 302. In one embodiment, each physical device (computer or server) has a hypervisor 310 and associated DNS proxy 302. Processors and storage devices at the physical device such as a computer or server 202 shown in FIG. 2 can be considered as implementing the functionality of the DNS proxy 302.

A DNS server 304 can comprise a shared DNS server that serves multiple virtual networks. The shared DNS server can be provisioned and maintained with independent operation for each associated virtual network. The DNS server 304 can comprise one or more storage devices 304a (memories) and one or more processors 304b in communication with one another.

The DNS Server 302 may be a DNS server capable of providing:

1. Support for a "bring your own domain name" scenario, allowing DNS zones to be configured by multiple tenants. A DNS zone may be any contiguous portion of the domain name space in the Domain Name System (DNS) for which administrative responsibility has been delegated to a single manager.

2. Ability to perform name resolution for customer hosted domains, while providing tenant isolation during name resolution 3. Isolation of management interfaces and persistent store for DNS zones. Application Programming Interfaces (APIs) can be provided to create virtual instance on DNS server. The virtual instances can have DNS zones that contain DNS records. These APIs can be isolated so that other users cannot access them. The APIs can send info to an underlying system which can perform a Remote Procedure Call (RPC) to the DNS Server 302.

4. Isolation of server settings (forwarders, conditional forwarders etc.). Configuration settings for each of the virtual networks at the DNS Server 302 may be independent.

5. Ability to perform tenant specific Dynamic DNS (DDNS) updates.

6. Isolation of DNS zone transfers. DNS zone transfers allow two DNS servers to synchronize. A zone transfer request can include a tag of the virtual network ID to allow the correct local namespace information to be synchronized.

7. Support for traffic management within the tenant domain

8. Ability to perform public name resolution.

The DNS server can be composed of multiple virtualization instances with tenant specific data and settings, each mapped to a virtual network. Using the virtual network ID in the incoming query, the DNS server may perform the name resolution tasks. The DNS server may also be capable of performing public name resolution.

Figure 5:
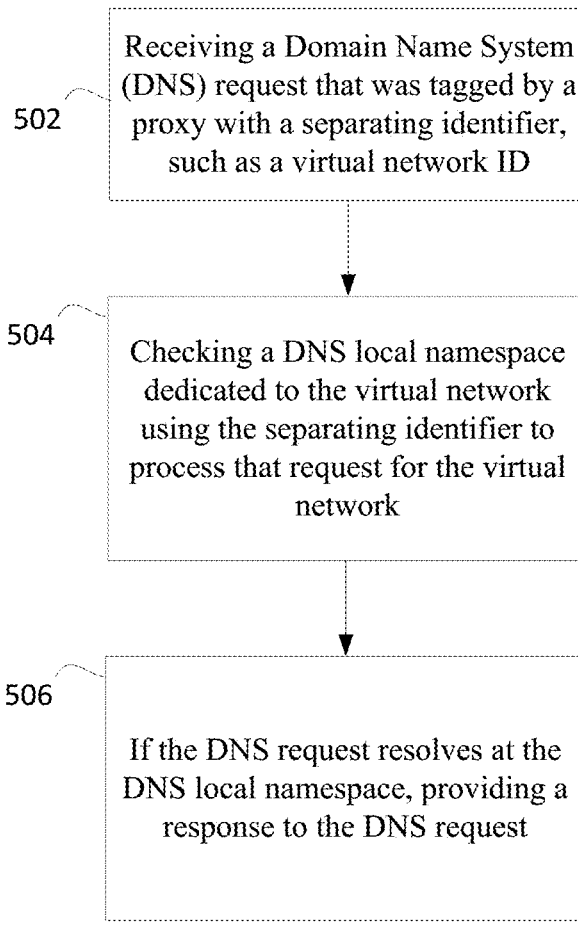
FIGS. 5 and 6 illustrate methods performed at a DNS server.

FIG. 5 shows a method that can be performed at the DNS server 304.

In step 502, a DNS request that was tagged by a proxy with a separating identifier, such as a virtual network ID, is received. A separating identifier, such as the virtual network ID, allows the DNS server 304 to determine which virtual network the DNS request is for.

In step 504, a DNS local namespace dedicated to the virtual network is checked using the separating identifier to process that request for the virtual network. Since local namespaces are used, each virtual network can independently map the same domain name to different IP addresses.

In step 506 if the DNS request resolves at the DNS local namespace, a response is provided to the DNS request. Otherwise, the request can be resolved at a DNS cache or an external DNS server.

The example of FIG. 3 shows how the local namespaces are allowed to conflict. In FIG. 3, the red tenant virtual network 306 and the blue tenant virtual network 308 can independently define mappings of names such as "vm1.contoso.com" to different IP addresses. When a DNS request (such as one tagged with the virtual network ID for the red tenant virtual network 306) is received for "vm1.contoso.com", the DNS server 304 can supply the correct IP address back to the DNS proxy 302. The namespace for red tenant virtual network 306 and for the blue tenant virtual network 308 can be allowed to conflict. This can allow an existing network to be converted into a virtual network without having to modify the namespace such that it does not conflict with another namespace. It is also possible that instances may not have a DNS record for a given name.

The DNS request can be replied to with a response that is tagged with the separating identifier, such as the virtual network ID. Alternately, other addressing methods can be used.

The DNS server 304 can check a shared DNS cache for the DNS request if the request does not resolve at the DNS local namespace. The shared DNS cache can be used for multiple virtual networks since it stores IP addresses for the external network. For example, when the DNS request concerns a request for an IP address of a location on an external network, the IP address may or may not be stored in this shared cache. If the IP address is stored in this shared cache, the DNS server 304 can respond with the IP address. The DNS server 304 can check with an external DNS server if the request does not resolve at the shared cache. The shared cache can then be updated with the IP address from the external DNS server.

Figure 6:
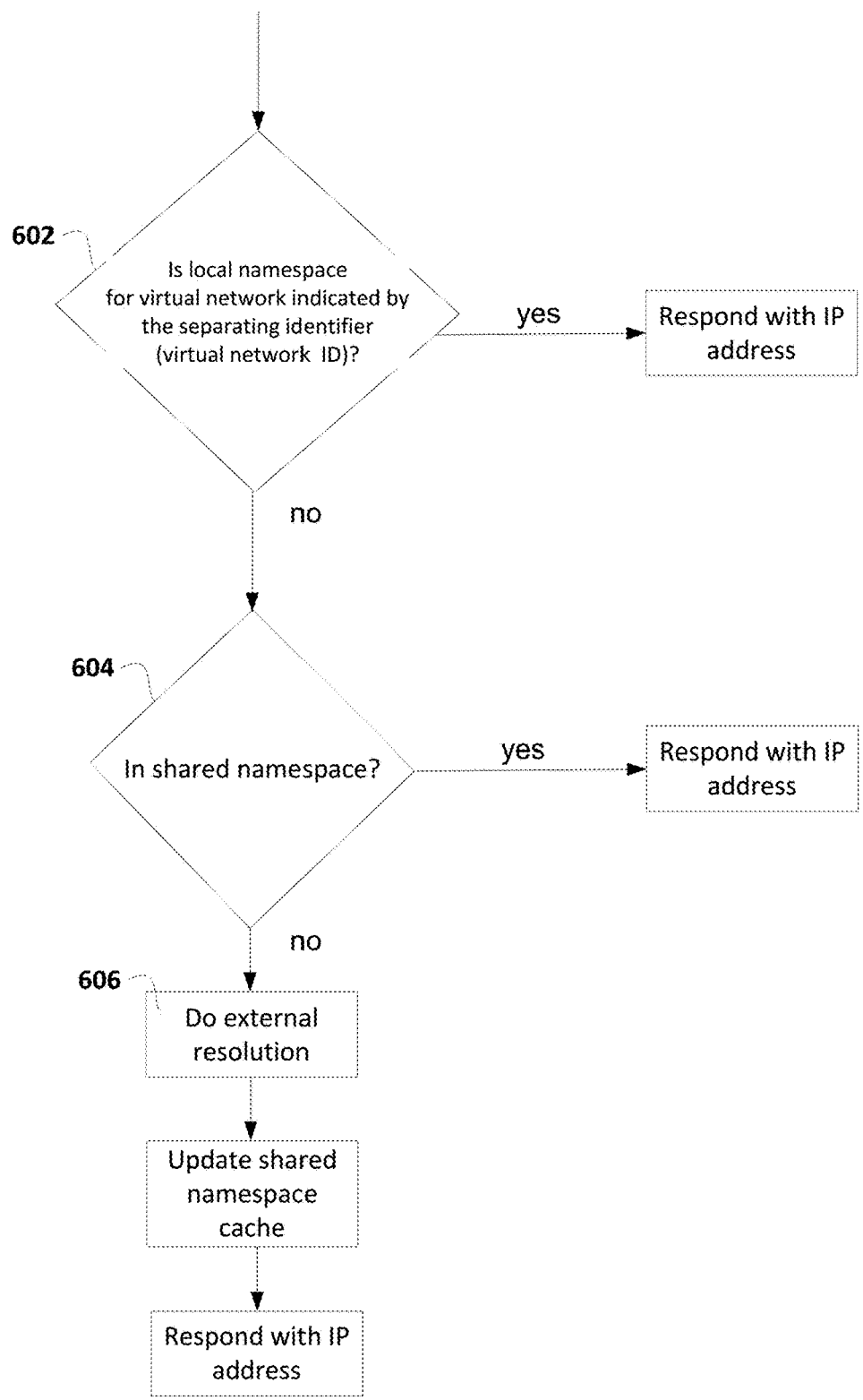

As shown in FIG. 6, at the shared DNS server 304, the resolution may be done in the following order until a match is found:

1) Checking the local namespace for the virtual network indicated by the separating identifier (step 602).
2) Checking a shared namespace (step 604).
3) Performing an external resolution (step 606).

To provision the system, once a virtual network is created, the DNS proxy and DNS server are instructed about the correspondence of the separating identifiers (such as the virtual network IDs) and the virtual network. The DNS server then creates a partition for the virtual network to store the local namespace. A management process can set up and update the local namespace information at the DNS server.

It should be appreciated that any software components described herein may, when loaded into a processor and executed, transform the processor from a general-purpose computing system into a special-purpose computing system customized to facilitate the functionality presented herein. The processor may be constructed from any number of transistors or other discrete circuit elements, which may individually or collectively assume any number of states. More specifically, the processor may operate as a finite-state machine, in response to executable instructions contained within the software modules disclosed herein. These processor-executable instructions may transform the processor by specifying how the processor transitions between states, thereby transforming the transistors or other discrete hardware elements constituting the processor.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture in order to store and execute the software components presented herein. It also should be appreciated that the architecture may include other types of computing devices, including hand-held computers, embedded computer systems, smartphones, PDAs, and other types of computing devices known to those skilled in the art. It is also contemplated that the architecture may not include all of the components shown in the figures, may include other components that are not explicitly shown in the figures, or may utilize an architecture completely different from that shown the figures.

Alternatively, or in addition, the functionally described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Computer-readable storage media may provide storage for instructions for the one or more processors. Although the description of computer-readable storage media contained herein refers to a mass storage device, such as a hard disk or CD-ROM drive, it should be appreciated by those skilled in the art that computer-readable media may be any available storage media.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which may be used to store the desired information and instructions. For purposes of this specification and the claims, the phrase "computer-readable storage medium" and variations thereof, does not include waves, signals, and/or other transitory and/or intangible communication media.

Although the subject matter presented herein has been described in language specific to computer structural features, methodological and transformative acts, specific computing machinery, and computer-readable storage media, it is to be understood that the methods and devices defined in the appended claims is not necessarily limited to the specific features, acts, or media described herein. Rather, the specific features, acts, and mediums are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed:

1. A method for use by at least one processor and at least one memory, wherein computer-executable instructions are stored in the at least one memory which, when executed by the at least one processor, perform a method comprising:
   receiving, by a Domain Name System (DNS) proxy coupled between a shared multi-tenant DNS server and a plurality of virtual networks, a DNS request from a virtual network of the plurality of virtual networks, the shared multi-tenant DNS server storing DNS data for each of the plurality of virtual networks, the shared multi-tenant DNS server hosting isolated domain name databases, each domain name database being associated with a different virtual network of the plurality of virtual networks, each of the plurality of virtual networks having a dedicated DNS local namespace;
   tagging, by the DNS proxy, a separating identifier to the DNS request; and
   forwarding, by the DNS proxy, the DNS request to the shared multi-tenant DNS server.

2. The method of claim 1, wherein the separating identifier is a virtual network ID.

3. The method of claim 2, wherein the virtual network ID is placed in an option field.

4. The method of claim 1, wherein the separating identifier is a virtual network ID or a function of a virtual network ID.

5. The method of claim 1, wherein the DNS proxy examines all DNS requests and DNS responses at a location.

6. A method for use by at least one processor and at least one memory, wherein computer-executable instructions are stored in the at least one memory which, when executed by the at least one processor, perform a method comprising:
   receiving, by a multi-tenant Domain Name System (DNS) server, a DNS request that was tagged by a proxy with a separating identifier, the multi-tenant DNS server configured to serve a plurality of virtual networks, the multi-tenant DNS server hosting isolated domain name databases, each domain name database being associated with a different virtual network of the plurality of virtual networks;
   accessing, by the multi-tenant DNS server, a DNS local namespace dedicated to a virtual network of the plurality of virtual networks based on the separating identifier;
   using, by the multi-tenant DNS server, the separating identifier to process the request for the virtual network to resolve the DNS request; and
   if the DNS request resolves at the DNS local namespace, providing, by the multi-tenant DNS server, a response to the DNS request to the proxy.

7. The method of claim 6, wherein the separating identifier is a virtual network ID or a function of a virtual network ID.

8. The method of claim 7, wherein the virtual network ID is in an option field.

9. The method of claim 6, further including
   accessing a shared DNS cache for the DNS request if the request does not resolve at the DNS local namespace; and
   if the DNS request resolves at the DNS cache, providing a response to the DNS request.

10. The method of claim 6, wherein a shared DNS cache is used for multiple virtual networks including the virtual network.

11. The method of claim 10, further including checking an external DNS server if the request does not resolve at the shared DNS cache.

12. A Domain Name System (DNS) proxy coupled between a shared multi-tenant DNS server and a plurality of virtual networks, comprising:
one or more storage devices; and
one or more processors in communication with the one or more storage devices, wherein the one or more processors are configured to:
receive a DNS request from a virtual network of the plurality of virtual networks, the shared multi-tenant DNS server storing DNS data for each of the plurality of virtual networks, the shared multi-tenant DNS server hosting isolated domain name databases, each domain name database being associated with a different virtual network of the plurality of virtual networks, each of the plurality of virtual networks having a dedicated DNS local namespace;
tag, by the DNS proxy, a separating identifier to the DNS request; and
forward, by the DNS proxy, the DNS request to the shared multi-tenant DNS server.

13. The proxy of claim 12, wherein the separating identifier is a virtual network ID.

14. The proxy of claim 13, wherein the proxy is configured to receive a DNS response to the DNS request from the shared multi-tenant DNS server, the DNS response being tagged with the virtual network ID, the DNS response being provided to the virtual network of the plurality of virtual networks.

15. The proxy of claim 13, wherein the virtual network ID is placed in an option field.

16. The proxy of claim 12, wherein the proxy examines all DNS requests and DNS responses at a location.

17. The method of claim 1, further comprising:
receiving, by the DNS proxy, a DNS response from the shared multi-tenant DNS server; and
forwarding, by the DNS proxy, the DNS response to the virtual network of the plurality of virtual networks.

18. The method of claim 17, wherein the DNS response is tagged with the separating identifier.

19. The method of claim 6, wherein the response to the DNS request is tagged with the separating identifier.

20. The method of claim 6, further comprising:
creating, by the multi-tenant DNS server, a partition for the virtual network of the plurality of virtual networks to store the DNS local namespace.

* * * * *